United States Patent Office 3,203,846
Patented Aug. 31, 1965

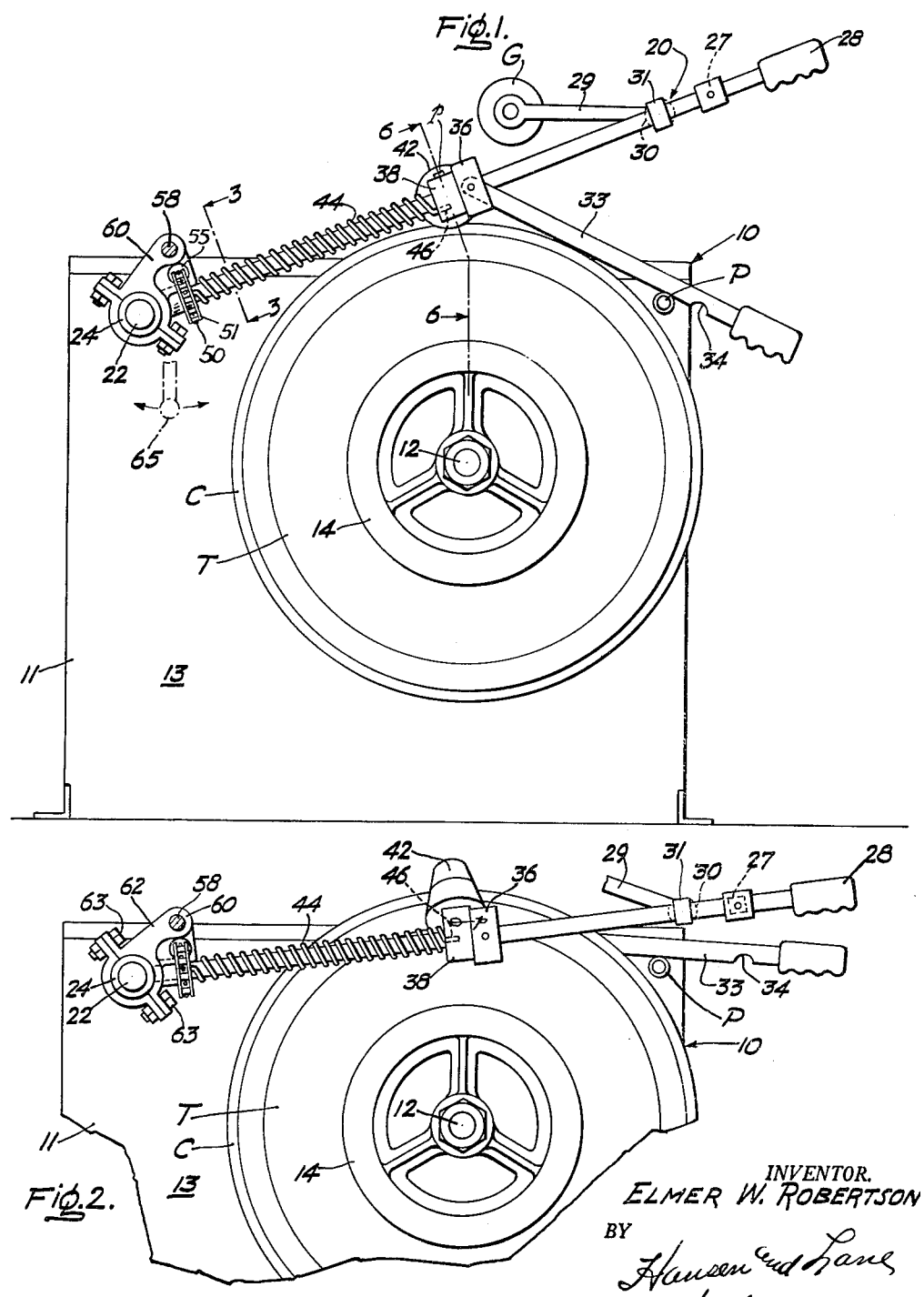

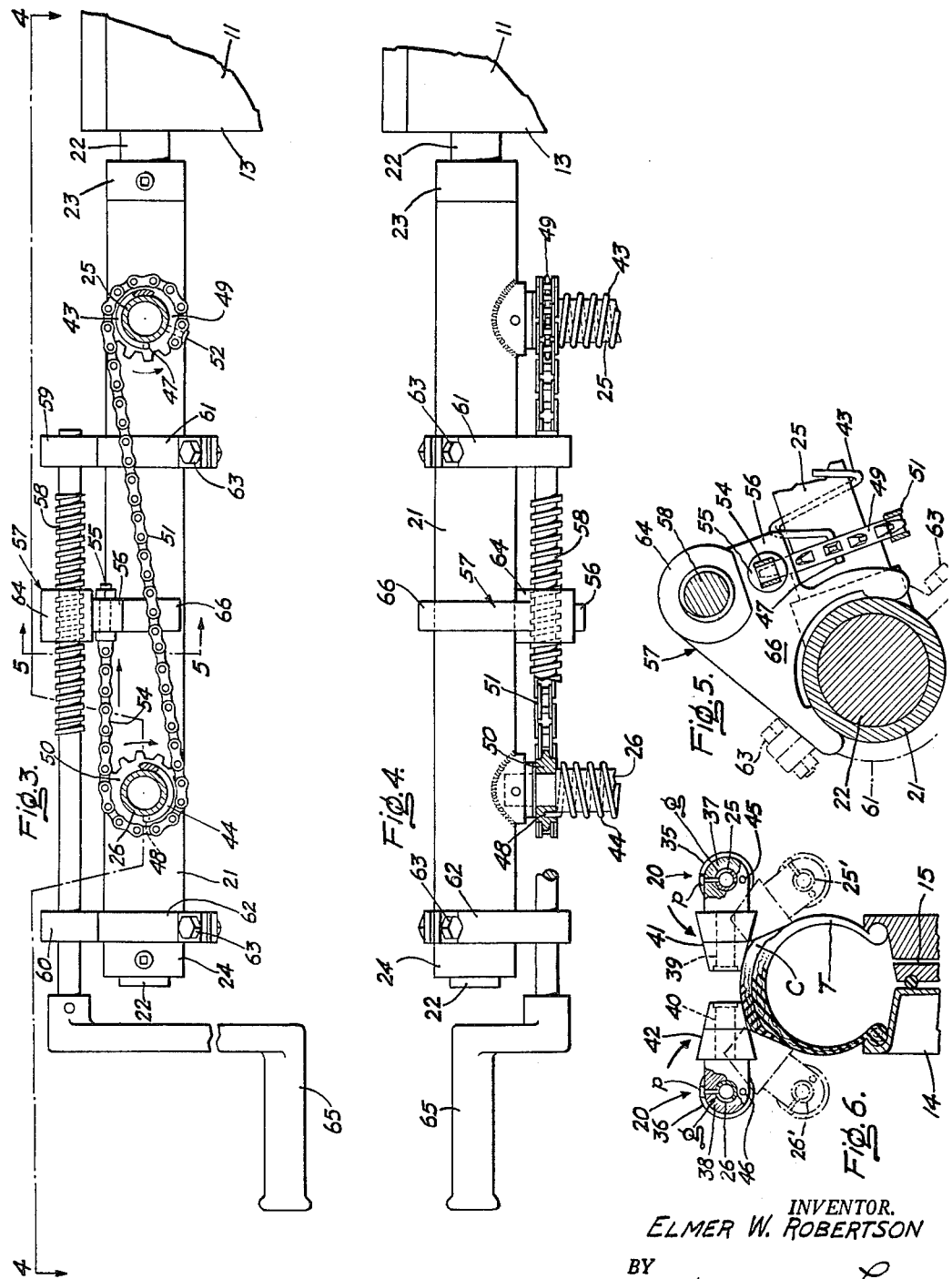

3,203,846
TIRE TREAD LAYING DEVICE
Elmer W. Robertson, Berkeley, Calif., assignor to Elrick Industries, Inc., Oakland, Calif.
Filed Oct. 1, 1962, Ser. No. 227,484
5 Claims. (Cl. 156—410)

This invention relates to apparatus for pressing new tread rubber onto the buffed face of a tire carcass and more particularly to a pressure regulator for a tread laying device.

The present invention is embodied in an apparatus of known design for pressing recap tread rubber, commonly known as "camelback," onto the prepared, worn surface of a pneumatic tire carcass. It is one object of this invention to provide a single mechanism for regulating and equalizing the amount of pressure to be applied to the recap rubber via a pair of presser rollers arranged for bearing engagement upon the same.

It is another object of this invention to provide a single mechanism for increasing and/or decreasing the torsional strength of helical springs by which the pressure rollers are tensioned for pressured engagement with a tire tread. In this connection it is a further object to provide a pressure regulator for spring loaded presser rollers and for synchronizing a pair of such rollers to equalize the compressive strength thereof irrespective of changes in adjustment thereof.

These and other objects and advantages of the present invention will become apparent in the following description and drawings in which:

FIG. 1 is a side elevational view of a tread layer embodying the present invention.

FIG. 2 is a fragmentary portion of FIG. 1 with the pressure lever thereof in a different position.

FIG. 3 is a section through the pressure lever of FIG. 1 taken along line 3—3 thereof and at slightly larger scale with respect thereto.

FIG. 4 is a plan view of FIG. 3 with parts thereof in section as seen from line 4—4 thereof.

FIG. 5 is a section through FIG. 3 taken along line 5—5 thereof.

FIG. 6 is a section through the presser rollers of the presser lever of FIG. 1 and taken along line 6—6 thereof.

At the outset a brief explanation of the tread-layer structure and its operation will be given in order that a clear understanding of the pressure regulating feature of the present invention will be had.

The tread layer 10 FIGS. 1 and 2 consists of a stand 11 which houses a motor (not shown) for driving a spindle 12 which is journaled in the stand and extends from one side wall 13 thereof to receive and support a split rim wheel 14 (FIG. 6) upon which a tire carcass T is to be mounted. Also confined within the stand or housing 11 is an air pressure system with regulators for admitting air under pressure into the tire carcass from a passage 15 in one half of the split rim wheel 14 via a passage (not shown) formed in the spindle 12.

A tire T which has already been buffed and conditioned for recapping is mounted on the wheel 14 and inflated at a proper pressure (about 5 to 10 pounds/sq. in.) so that it will not yield or collapse when tread rubber is applied.

The tread surface of the tire T is first coated with a suitable rubber cement after which a ribbon strip of "camelback" tread rubber C is placed by hand around the entire periphery of the tire.

A presser lever 20 is arranged on the stand 11 to enable a person to apply pressure to the newly applied tread rubber C. This presser lever 20 comprises a pair of lever arms extending in parallel relation to each other, radially from a sleeve shaft 21 journaled on a shaft 22 extending from the stand 11 in parallel, spaced relation with respect to the spindle 12. The sleeve shaft 21 is secured against axial shifting on the shaft 22 by inner and outer collars 23 and 24 so that the two lever arms 25 and 26 straddle the tire T and wheel 14 mounted on the spindle 12.

The upper or outer ends of the lever arms 25–26 are rigidly secured together by a cross bar 27 which is parallel to the sleeve shaft 21 to form a parallelogram shape with the two arms 25 and 26. Thus the lever 20 can receive a substantial segment of the tire tread within the open center of the parallelogram lever 20 when the latter is lowered by means of hand grips 28 at the ends of the lever arms 25–26.

A centering roller G is mounted on one end of a center arm 29 and has its opposite end journaled to a cross rod 30 having its ends pivoted in a collar 31 secured one to each of the spaced lever arms 25–26 adjacent the cross bar 27. The cross rod 30 is friction mounted and spring loaded to enable the center arm 29 and centering roller G to assume any position of adjustment by hand. The lever 20 is normally held in inoperative position by a prop 33 pivotally mounted on that lever arm 25 which is adjacent the stand 11 so that the prop 33 can have a notch 34, formed on its under edge, engage a peg P projecting from the stand 11. In this manner the presser lever 20 is held angularly above the tire mounted on the wheel 14 to enable the operator to mount and demount a tire on the wheel.

A block collar 35 and 36 is secured to each lever arm 25 and 26, respectively, a distance from the sleeve shaft 21 substantially equal to the distance of the latter radially from the spindle 12. Each lever arm 25 and 26 has a collar 37 and 38, respectively, journaled thereon and each such collar has a spindle shaft 39 and 40 extending radially therefrom. Each spindle carries a pair of frusto conical shaped presser rollers 41 and 42, respectively. These frusto conical rollers 41 and 42 freely rotate upon their respective spindle shafts 39 and 40 and are adapted to engage the newly applied tread rubber C on the periphery of the tire T.

These presser rollers 41–42 are spring loaded by spiral springs 43 and 44 mounted on the respective lever arms 25 and 26. Each spring 43–44 has one end (46, FIGS. 1 and 2 and 45–46 FIG. 6) engaged in the collar 37–38, as the case may be, and its opposite end 47–48 anchored or fixed to the respective lever arm 35–36 or some member thereon to urge the presser rollers downwardly toward the tire tread C.

As best seen in FIG. 6 a pin p between the lever arm 25–26 and the collar 37–38, respectively, mounted thereon serves to limit rotary movement of the collar relative to the arm. The pin p which is mounted on the arm extends into a half circle groove g in the collar and stops turning of the latter under the influence of its spring 43–44 as the case may be. The spindle shafts 39 and 40 are normally disposed in axial alignment (facing each other) so that the presser rollers 41 and 42 are ready to bear upon the tread rubber C. However, the rollers, spindle shafts and collars are free to turn upwardly and outwardly when the lever arms 25–26 are pressed down over the tire.

The pressure regulator of the present invention, now to be explained, is best suited for a tread layer as above described. In this connection it has been found that changes in weather, temperature and relative humidity affect the camelback rubber C. In other words, during warm or hot weather camelback is more pliable and inclined to stretch requiring less pressure. On the other hand, during colder weather the camelback is more firm and rigid requiring greater pressure to apply the same to a tire. In accordance with the present invention it is contemplated that the pressure at which the two presser rollers 41 and 42 engage the tread rubber C be synchronized. Moreover, that although the pressure requirements may vary according to room temperature, weather conditions and the like, any adjustment of pressure required will be uniformly accomplished on both pressure springs 43–44 simultaneously and in synchronism with each other.

To this end the anchored or relatively fixed end 47 and 48 of the springs 43 and 44, respectively, is secured to a sprocket 49–50 as the case may be. As best illustrated in FIG. 4 the coil springs 43 and 44 have their spiral convolutes oppositely tending to exert a downward pressure to the presser rollers 41–42 which face each other from the parallel lever arms 25–26 as seen in FIG. 6. The coil springs 43–44 have convolutes of slightly greater diameter than that of the lever arms 25–26 upon which they are mounted to assure sufficient clearance at all times with respect thereto during tightening and/or releasing of the tension on these springs.

Neither sprocket 49 nor 50 is secured to the arm 25 or 26 upon which it is mounted but is pressed against the sleeve shaft 21 by the respective coil spring 43–44. As seen in FIG. 4 the sprockets are journaled for rotation relative to the respective arm upon which they are mounted and are free to turn relative thereto.

The two sprockets 49 and 50 are operatively connected by means of a chain 51 for turning them in unison in opposite directions. To accomplish this, one end of the chain 51 is secured to the sprocket 49 as at 52 and is trained around said sprocket in one direction (counter clockwise FIG. 3). The chain 51 extends diagonally from the sprocket 49 to the other sprocket 50 so as to be trained around the latter in an opposite direction (clockwise FIG. 3). The other free end 54 of the chain 51 is secured by means of a bolt 55 to a depending lug 56 of a rider 57 which is arranged for axial movement on a screw shaft 58. The screw shaft 58 has its ends journaled for turning in a pair of bushings 59 and 60, one on a two piece clamp casting 61 and the other on the same kind of clamp casting 62. These clamp castings 61 and 62 are secured to bolts 63 upon the sleeve shaft 21 so as to turn therewith about the axis of the spindle shaft 22 when the lever arm 20 is manipulated relative thereto.

The rider 57 has an internally threaded bushing 64 threadedly mounted on the screw shaft 58 that upon turning of the latter by means of a hand crank 65 the bushing 64 and lug 56 thereon will be caused to travel axially of the screw shaft 58.

The rider 57 has a yoke 66 formed integrally therewith embracing the sleeve shaft 21 for preventing turning of the rider with the screw shaft 58. The screw shaft 58 being parallel to the sleeve shaft 21, so is the bolt 55 and the free end 54 of the chain 51. In this connection it will be noted that the periphery of the sprocket 50 is tangent to the free end 54 of the chain so that the chain extends toward the rider 57 in a plane coincident to the axis of the bolt 55 thereby causing the free end 54 of the chain 51 to be disposed parallel to the axes of the sleeve shaft 21 and the screw shaft 58.

As the crank 65 is turned counter clockwise, FIGS. 1, 3 and 5, the rider 57 will move away from the sprocket 50 (to the right FIG. 3) to thereby turn the sprocket 50 clockwise and the sprocket 51 counter clockwise against the action of the coil springs 43–44. This causes the respective coil springs 43–44 to be wound tighter about the respective lever arms 25–26. In this manner the pressure rollers 41–42 are caused to bear with greater pressure against the retread rubber C of a tire T mounted on the wheel 14. When the crank 65 is turned in an opposite direction (clockwise FIGS. 1, 3 and 5) the rider 57 will move toward the sprocket 50 (to the left FIG. 3) thereby releasing the latter and sprocket 49 for turning under the influence of their respective coil springs 43 and 44. In this manner the springs 43–44 exert a lesser torsional thrust on the presser rollers 40–41 so that the latter will more readily yield when pressed against the recap rubber C on the tire T.

In either case, it will be noted that the two presser rollers engage the tread rubber C with equal pressure and that irrespective of any change in spring pressure is equalized by reason of the synchronous turning of the sprockets by the single chain 51.

While I have described my pressure regulator for tread layer in specific detail it will be appreciated by those skilled in the art that the same may be susceptible to variations, alterations and/or modifications without departing from the spirit of my invention therein. I therefore desire to avail myself of all variations, alterations and/or modifications as fairly come within the purview of the appended claims.

What I claim as new and desire to protect by Letters Patent is:

1. In combination with the spring loaded presser rollers of a tread layer in which the presser rollers are rotatably mounted on spindle shafts extending toward each other from a pair of rigidly connected spaced lever arms extending in parallel relation from a sleeve shaft pivotally mounted for manual movement downwardly astride a tire having new tread rubber thereon and in which each presser roller is connected to one end of a torsion spring mounted on the respective lever arms; a pressure regulator comprising a sprocket mounted for free rotation one on each of such spaced arms and each said sprocket forming an anchor for the opposite end of the torsion spring engaging the same, a screw shaft supported in parallel relation to the sleeve shaft for hand crank turning, a rider on said screw shaft, and a chain having one end secured to said rider and trained in one direction around one of said sprockets and in an opposite direction around the other one of said sprockets and secured to the latter for tightening and loosening the tension of said torsion springs in unison.

2. The combination with a pair of presser rollers of a tread layer in which the presser rollers mounted on a pair of rigidly connected parallel spaced lever arms pivotally mounted on a sleeve shaft for manual movement downwardly astride a tire having new tread rubber thereon and in which the presser rollers are connected to one end of a torsion spring mounted on the respective level arms; a pressure regulator comprising a sprocket mounted for rotation one on each of such spaced arms adjacent the sleeve shaft and having the opposite end of the torsion spring engaging the same anchored thereto, a screw shaft mounted on the sleeve shaft and parallel thereto for hand crank turning, a rider on said screw shaft, and a chain having one end secured to one of said sprockets and trained in one direction around said one of said sprockets and in an opposite direction around the other one of said sprockets, said chain having its opposite end secured to said rider for pulling and loosening said chain and for increasing and decreasing the tension of said torsion springs in unison for regulating the bearing pressure of said presser rollers relative to the tread of a tire engaged thereby.

3. For a tread layer in which a pair of presser rollers overlaying the tread rubber of a tire mounted on a spindle for recapping are mounted for free turning in a plane parallel to said spindle on a pair of rigidly connected spaced lever arms extending from a sleeve shaft pivotally mounted for manual movement downwardly astride the tire; a pressure regulator for said presser rollers comprising a sprocket mounted for free turning one on each of said spaced arms, a torsion spring mounted on each said lever arm between the sprocket and presser roller thereon and having its ends anchored to the sprocket and presser roller engaged thereby, a screw shaft journaled between a pair of brackets mounted on said sleeve shaft, a hand crank on said screw shaft for turning the same, a rider on said screw shaft for movement therealong upon turning thereof, and a chain having one end secured to said rider and trained in one direction around one of said sprockets and in an opposite direction around the other one of said sprockets and secured to the latter for tensioning and loosening the tension of said torsion springs in unison to thereby increase and decrease in synchronism the bearing pressure of said pressure rollers against the tread rubber on said tire.

4. In a tread layer of the type having a pair of parallel spaced arms joined and pivoted for swinging movement astride the tread of a tire journaled for turning about an axis parallel to that about which said arms swing, and a pair of spring loaded presser rollers journaled for free turning one on each of said arms for engaging the tread rubber on said tire; a pressure regulator comprising a sprocket journaled for free turning on each of said arms, a torsion spring on each of said arms having one end connected to the presser roller thereon and an opposite end anchored to the said sprocket thereon, a manually turnable screw shaft mounted on said lever arms adjacent said sprockets and parallel to the pivotal axis about which said lever arms swing, a rider on said screw shaft for movement therealong during turning thereof, a chain having one end secured to one of said sprockets and trained around the latter in one direction and extending to the other of said sprockets and trained around the latter in an opposite direction, and means for securing the opposite end of said chain to said rider for simultaneously turning said sprockets in opposite directions to thereby synchronously change the tension of said tension springs and the bearing pressure of said presser rollers against the tread of a tire engaged thereby.

5. In a tread layer of the type having a presser lever including a pair of arms extending in parallel relation from a sleeve shaft pivotally mounted for swinging movement astride a tire having new tread rubber applied thereto and a pair of spring loaded presser rollers journaled one on each of said arms to extend from the latter for overlaying and engaging the tread rubber on said tire, a pressure regulator comprising a sprocket journaled for free turning on each said arm adjacent said sleeve shaft, a torsion spring on each said arm having one end secured to the presser roller thereon and an opposite end anchored to said sprocket thereon, a pair of clamp brackets secured to said sleeve shaft, a manually turnable screw shaft extending parallel to said sleeve shaft and journaled for turning movement on said clamp brackets, a rider on said screw shaft for movement therealong during turning thereof, and a chain having one end secured to one of said sprockets and trained around the latter in one direction and extending to the other of said sprockets and trained around the latter in an opposite direction, and means for securing the opposite end of said chain to said rider for simultaneously turning said sprockets in opposite directions to thereby change the tension of said tension springs and accordingly the bearing pressure of said presser rollers against the tread rubber on said tire.

References Cited by the Examiner

UNITED STATES PATENTS

| 1,994,561 | 3/35 | Bostwick | 156—409 |
| 2,342,951 | 2/44 | Lyle | 156—408 |
| 2,612,988 | 10/52 | Andrews | 74—272.8 |
| 3,097,984 | 7/63 | Godfrey | 156—408 |

FOREIGN PATENTS 286,912   3/28   Great Britain.

ALEXANDER WYMAN, *Primary Examiner.*

HAROLD ANSHER, *Examiner.*